UNITED STATES PATENT OFFICE.

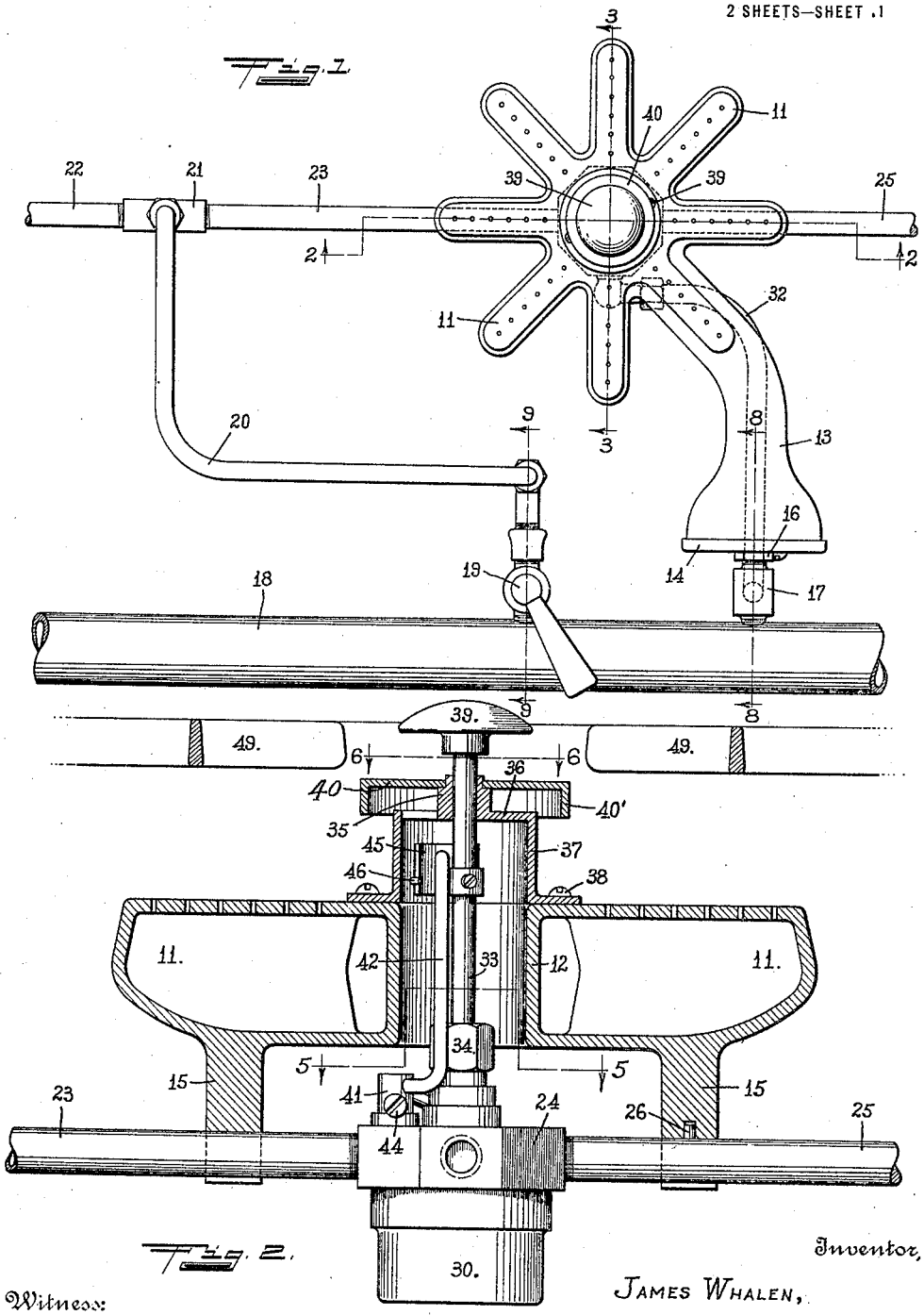

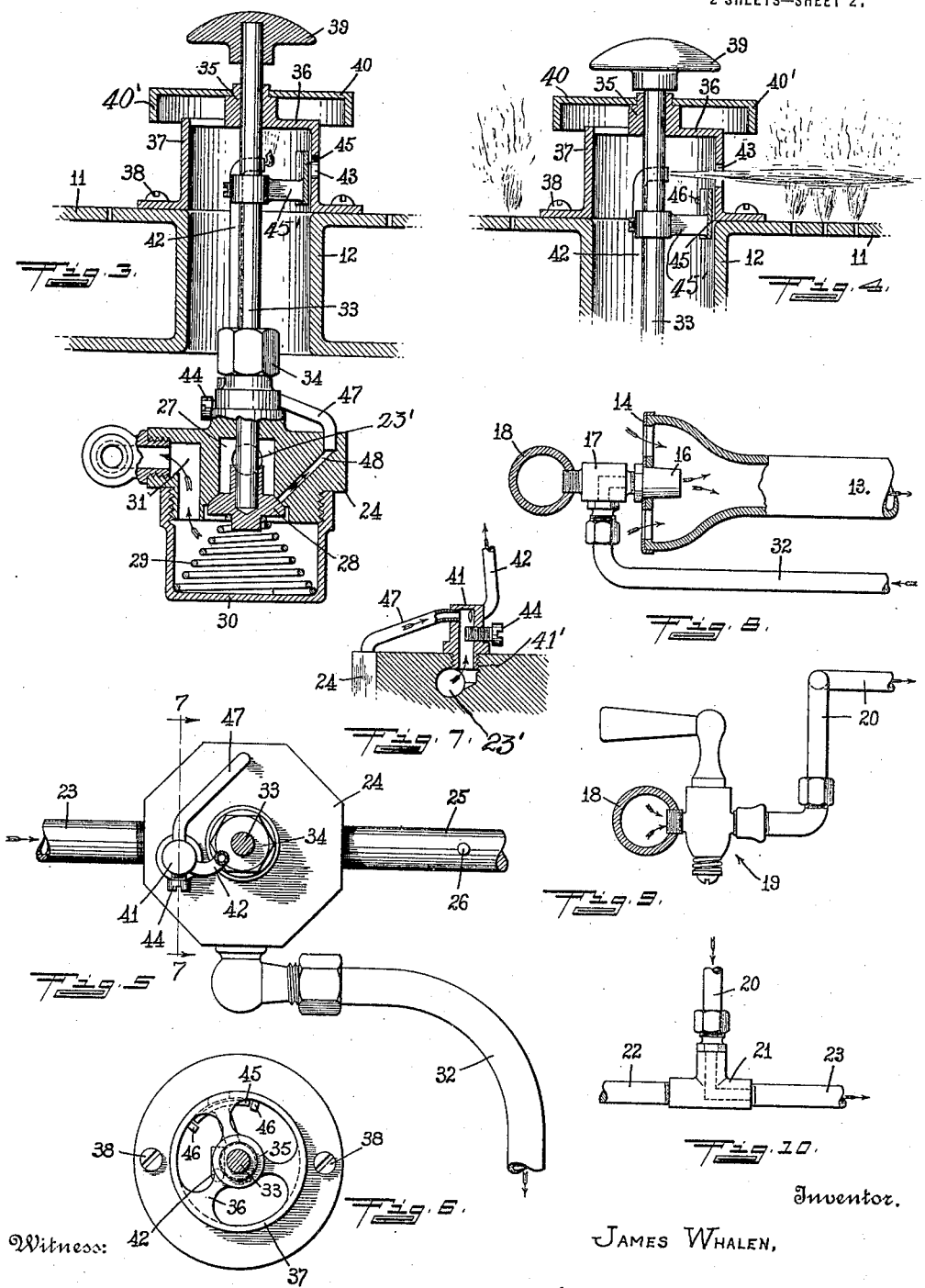

JAMES WHALEN, OF OMAHA, NEBRASKA.

VALVE AND IGNITION MECHANISM FOR GAS-STOVES.

1,312,655.     Specification of Letters Patent.     Patented Aug. 12, 1919.

Application filed January 28, 1918. Serial No. 214,223.

*To all whom it may concern:*

Be it known that I, JAMES WHALEN, a citizen of the United States, and a resident of Omaha, in the county of Douglas and State of Nebraska, have invented certain new and useful Improvements in Valves and Ignition Mechanism for Gas-Stoves, of which the following is a specification.

My invention relates to article-controlled valve and ignition mechanism for gas stoves and the like. It is the object of my invention to provide means attachable to an ordinary gas-stove burner, by which the placing of an article such as a cooking vessel upon the burner will open a valve controlling the fuel-supply thereto; and the removal of the vessel permit automatic movement of the valve to closed position. Further objects of my invention are to provide an ignition-pilot for lighting the burner when the gas is supplied thereto; to provide means for shielding the pilot-light to prevent accidental extinguishment thereof; and to provide means for augmenting momentarily the gas supply to the pilot-light when the main controlling-valve is opened, whereby a flame-jet from the pilot-light will be projected across the burner as the gas begins to issue therefrom. A further object of my invention is to provide, in a mechanism having the foregoing characteristics, means by which the burner may be readily removed or dismounted for cleaning the same, without disturbing the automatic valve and ignition device.

In the accompanying drawings, Figure 1 is a plan view of a gas burner having my devices applied thereto, Fig. 2 is a vertical sectional view thereof on the plane of the line 2—2 of Fig. 1, Fig. 3 is a vertical section through the valve and a part of the burner, the section being in the plane of the line 3—3 of Fig. 1, Fig. 4 is a detail section in the same plane, showing the operation of the pilot-jet, Fig. 5 is a detail plan view of the valve, parts being in section on the line 5—5 of Fig. 2, Fig. 6 is a detail horizontal section on the line 6—6 of Fig. 2, the cap of the pilot-guard being removed, Fig. 7 is a detail vertical section on the line 7—7 of Fig. 5, Fig. 8 is a detail vertical section on the line 8—8 of Fig. 1, Fig. 9 is a detail vertical section, partly on the line 9—9 of Fig. 1, and Fig. 10 is a detail front view of the gas-supply connection to the tubular burner-supporting rod.

In the structure shown there is a gas burner of the ordinary "star" pattern, comprising a plurality of hollow arms 11 extending radially from an annular central portion 12, said arms having rows of perforations in the upper sides thereof, and the burner being formed integrally with a mixing-pipe 13 having an enlarged end-portion provided with an air-controlling register 14. The burner has at its lower side leg-portions 15 which fit over and rest upon a horizontally extending rod, formed as hereinafter described, by which the burner is supported. The end of the mixing-pipe 13 is supported upon an adjusting-nipple 16, the latter being carried upon a T-connection 17 having a threaded blind end which is screwed into an opening in the main gas-supply pipe 18. Said pipe 18 will be understood to be the pipe usually provided at the front of a gas stove, from which all of the burners thereof are supplied. The blind T-connection 17 is in the place usually occupied by the manually operated shut-off cock or valve for controlling the gas supply to the burner. The hand-valve 19 is connected with another opening in the pipe 18, located as shown in Fig. 1, and from said valve a suitable connecting tube 20 is extended to a T-connection 21, the arrangement being as shown in Figs. 1, 9 and 10. The T 21 forms a part of the burner-supporting rod, which comprises in the portion thereof shown, a rod 22 screwed into one end of the T, a tubular rod or pipe 23 extending from the other end of the T to the main casing 24 of the automatic valve, and a rod 25 extending from the valve-casing 24 in alinement with the tubular rod 23. The burner-legs 15 rest upon the parts 23 and 25, and the latter is provided at its upper side with a pin 26 which extends into an opening in the leg and retains the burner longitudinally of the rod at a position centered over the valve-casing 24.

The hand-valve 19 is usually left open or partially open, being used to control the volume of gas supplied to the burner, but not to shut off the supply except occasionally, as when cleaning or adjusting the burner and automatic valve. Gas from the supply pipe 18 passes through the valve 19, and the connecting parts 20, 21, and 23, to a chamber 27 in the casing 24, shown in Fig. 3. At the lower end of said chamber there is a valve-seat with which a valve 28 is normally held in engagement by means of a conical coil spring 29 disposed below the same, said spring being contained in a cup or bottom-cap 30 screwed on the lower portion of the casing 24, as shown. The chamber within the bottom-cap 30 is in communication with a passage 31 through the casing 24, said passage leading to a tube 32 which extends to the lower opening of the T-connection 17, as shown in Fig. 8. From the valve 28 a stem 33 extends upwardly through a packing-gland 34 formed by an extension of the casing 24, said stem passing through the central opening of the burner-body 12, and the upper part of the stem being slidable through a guide 35. Said guide is carried by a spider 36 formed integrally with a cylindrical guard 37 having a base-flange which is secured on the top of the burner by screws 38. At the upper end of the stem 33 a knob 39 is removably seated thereon, the head of said knob being rounded or spherosegmental in form. The guide 35 is shouldered at its upper end to receive removably a hood 40 which projects laterally beyond the guard 37 and has a depending marginal flange 40' extending slightly below the upper end of the guard.

In the upper side of the valve-casing 24 there is a threaded opening 41' communicating with the passage 23' from the pipe 23 to the chamber 27, and into said opening is screwed a small hollow plug 41, as shown in Fig. 7. To the upper portion of said plug there is connected a small tube 42 which is extended up alongside the valve-stem 33 and turned laterally toward an opening 43 in the side of the cylindrical guard 37. An adjusting-screw 44 in the side of the plug controls the passage of gas from the pipe 23 through the plug to the tube 42, the screw being so adjusted that a small pilot-light may be maintained normally at the end of the tube within the guard 37. The opening 43 is normally covered by a plate or shield 45 which is carried by an arm 45' extending laterally from the valve-stem, as shown in Figs. 3 and 4. Rotation of the stem, which would displace the shield circumferentially of the guard, is prevented by guide-pins 46 at the sides of the shield, as shown. When the valve-stem is depressed as shown in Fig. 4, the shield uncovers the opening 43, so that a flame-jet from the pilot may be projected through the opening above one of the arms 11 of the burner, to ignite the gas issuing from the perforations therein. An additional momentary supply of gas to the pilot for forming the jet, is furnished as follows: To the upper part of the plug 41, above the adjusting-screw 44, there is connected a tube 47 which communicates with a port 48 extending through the casing 24 to the seat for the main valve 28. Upon opening of the main valve, gas from the chamber 27 is admitted to the port 48 and passes through the described connections to form a flame-jet which issues from the pilot through the opening in the guard and across the burner, as indicated in Fig. 4. When the valve 28 is fully opened, however, and the flow of gas is established through the connections to the burner, the pressure of the gas at the valve-seat becomes so reduced that very little gas will pass through the port 48 to the pilot-light, which thus is immediately reduced to its normal size or substantially so.

It will be understood that the knob 39 is so disposed that it will normally project slightly above the level of the supporting grate 49, usually provided in gas stoves, and indicated in Fig. 2. Thus when an article, such as a cooking vessel, is placed upon the grate, the knob and valve-stem are depressed thereby, the valve 28 opened to supply gas to the burner, and the supply of gas to the pilot momentarily augmented to form an igniting jet across the burner, as described. Owing to the rounded form of the knob 39, the same will be pushed down by a vessel upon the grate 49, even though the same is placed over the burner by sliding along the surface of the grate. Upon the removal of the cooking vessel or the like from the grate, the valve is returned to closed position by the upward pressure of the spring 29. The bottom-cap 30 forms a receptacle or chamber for receiving and collecting any moisture or impurities carried by the gas, and said cap may be removed from time to time and any accumulated sediment cleaned out of the same. It should be noted that, as the automatic valve is disposed below the burner and a free circulation of air may occur around the same, it will not be injuriously affected by the heat from the burner. It is preferable, however, that the gland 34 be packed with asbestos and flake graphite, the same constituting a packing material which I have found to be very durable and efficient under the conditions to which it is subjected. I wish to direct attention particularly to the means for shielding and protecting the pilot-light, the same being so inclosed by the guard and hood that while air may pass freely about the light to maintain combustion, yet the light is so protected that it is practically impossible for the same to be extinguished by drafts or by spilling of liquids over the burner, such as frequently occurs through the boiling over of cooking vessels. When it is desired to remove the burner from the stove, as for cleaning the same, the knob 39 is first removed from the valve-stem, and thereafter the burner lifted up off the stem and simultaneously disengaged from the nipple 16 where the latter enters the end of the mixing-pipe 13. The hood 40 and guard 37 are, of course, removed with the burner, but otherwise the valve and ignition mechanism is undisturbed. The knob 39 and hood 40 may be lifted off at any time, if it is desired to inspect, clean or light the pilot through the openings of the spider 36, as will appear from Fig. 6.

Now, having described my invention, what I claim and desire to secure by Letters Patent is:

1. The combination with a gas burner having a central annular portion, of a cylindrical guard secured to said central portion of the burner, a hood spaced from said guard and having an annular depending portion partially inclosing the same, a pilot-light disposed within said guard, means for supplying gas to the pilot-light and burner, a valve controlling the supply of gas to the burner and a part of the gas supply to the pilot-light, and a stem for actuating said valve, said stem passing slidably through and guided within said guard.

2. The combination with a gas burner having a vertical central air-passage, of a guard inclosing a continuation of said passage above the top of the burner, said guard having a lateral opening, a hood disposed over the top of said guard, a pilot-light disposed within said guard and adapted to direct a flame-jet through said lateral opening, means for supplying gas to the burner and pilot-light, a valve controlling the gas supply and having a stem movable vertically through the guard, and a shield connected with said valve-stem and adapted to cover and uncover the lateral opening simultaneously with opening and closing of the valve.

3. In combination with a gas stove burner, a valve controlling the supply of gas to the burner, valve-actuating means adapted for operation by the placing and removal of an article over the burner, a pilot-light disposed adjacent to the burner, a guard having an opening and inclosing the pilot-light, a shield normally covering the opening in said guard, and means connecting said shield and the valve-actuating means whereby the shield is moved to uncover the opening in the guard as the valve is opened to supply gas to the burner.

4. In combination with a gas stove burner, a valve controlling the supply of gas to the burner, valve-actuating means adapted for operation by the placing and removal of an article over the burner, a pilot-light disposed adjacent to the burner, a guard having an opening and inclosing the pilot-light, a shield normally covering the opening in said guard, means connecting the shield and the valve-actuating means whereby the shield is moved to uncover the opening in the guard as the valve is opened to supply gas to the burner, and means controlled by the valve for augmenting the supply of gas to the pilot-light as the guard-opening is uncovered.

JAMES WHALEN.

Copies of this patent may be obtained for five cents each, by addressing the "Commissioner of Patents, Washington, D. C."